Figure 1:
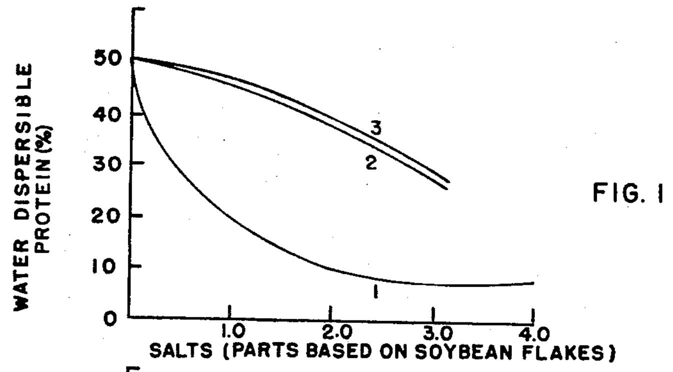

Jan. 2, 1968 T. M. PAULSEN 3,361,574

PROCESS FOR TREATING SOYBEAN PARTICULATES

Filed Aug. 12, 1963

$CaCl_2$ (PARTS BASED ON SOYBEAN FLAKES)

INVENTOR.

TWILA M. PAULSEN

BY Alton D. Oberholtzer

United States Patent Office 3,361,574

Patented Jan. 2, 1968

1

3,361,574
PROCESS FOR TREATING SOYBEAN PARTICULATES

Twila M. Paulsen, Minneapolis, Minn., assignor to Archer-Daniels-Midland Company, a corporation of Delaware Filed Aug. 12, 1963, Ser. No. 301,545
3 Claims. (Cl. 99—98)

This application is a continuation-in-part of application Ser. No. 075,923 filed Dec. 15, 1960 and now U.S. Patent 3,100,709.

This invention relates to an economical and improved critical processing system for eliminating soybean odor and soybean taste from uncooked or non-toasted particulates of soybeans in their preparation for use in light-colored foods for human consumption and the improved products obtained thereby. More particularly, the invention resides in a discovery of a way to eliminate soybean odor and soybean taste from particulates of soybeans prepared by normal processing and ground for use in food products, particularly for human consumption, by treatment of soybean flakes with protonic acids, salts of said acids and mixtures of said acids and said salts under critical treatment conditions of time, temperature and moisture prior to application in ultimate uses, and obtaining therefrom improved color, without soybean odor and soybean flavor.

This application provides for a modification over my co-pending application Ser. No. 075,923, now U.S. Patent No. 3,100,709, and distinguishes over my herewith filed co-pending application Ser. No. 301,559 in that the subsequent treatment with a water-soluble peroxide may be eliminated with a resultant retention of desirable functional characteristics and with improved wetting characteristic of the resultant ground products. The treatment as herein described is with protonic acids and their salts or mixtures of the same under specific conditions of heat and moisture pretreatment before processing for end use application. The protonic acids may be either ionizable organic or inorganic acids, which are water soluble, and defined by Brönsted-Lowry Theory. The salts, of these acids are also ionizable and can react with, or change the characteristics of amphoteric compounds such as proteins, under the critical conditions of non-cooking and non-toasting heat and limited moisture pretreatment, as herein described and disclosed.

Heretofore, the practice has been to heat process under pressure for cooking or toasting to eliminate soybean odor and flavor, with sacrifice in color, physical and functional characteristics. In the prior art, Phillips in U.S. Patent No. 1,510,606, discloses the addition of calcium chloride, a salt of a protonic acid, to effect the incorporation of calcium with soybean meal before or following a pressing and cooking operation. Otherwise the disclosure is not concerned with the color or characteristic soybean odor and soybean flavor. In animal feed it is known that in the absence of toasting or cooking soybeans have poor nutritional value.

Accordingly, it is an object of this discovery to provide the art with a process for treating particulates of soybeans, such as flakes, at high solids content, by intimate contact with either solutions of protonic acids, solution of salts of said protonic acids or solution mixtures of said acids and said salts, under temperature conditions of 65° C. to not over 100° C., for a period of a few seconds to not over about 15 minutes, with controlled moisture content at least sufficient to moisten, e.g., about 7% but not in excess of 20% in addition to equilibrium moisture, and dried in a manner to effect removal of soybean taste and soybean odor without detrimental effect to normal physical and functional characteristics and without detrimental color change in final light-colored food products for human consumption.

2

To the accomplishment of the foregoing and related ends, this invention comprises the improved features hereinafter more fully described and inherent therein, and as particularly pointed out in the claims. The following examples described in a nonlimiting manner chemical treatments of soybean particulate materials with protonic acids, the salts of such acids and mixtures of said acids and/or salts inclusive of the manners in which the inventive or improvement may be employed.

EXAMPLE NO. 1

An aqueous solution of $CaCl_2$ was sprayed onto hexane extracted soybean flakes at 90–100° C. while blending, i.e. in an insulated, baffle, rotating drum or a high speed mechanical blendor, so as to obtain uniform distribution of the solution on the flakes. The treated flakes were held at temperature for 5 mins., air dried to equilibrium moisture and ground to pass 100% through a 200-mesh screen.

Proportions for chemical treatment:

| | Parts |
|---|---|
| Soybean flakes | 100 |
| $CaCl_2 \cdot 2H_2O$ | 2.25 |
| $H_2O$ | 10 |

EXAMPLE NO. 2

An aqueous solution of $CaCl_2$ was sprayed onto hexane extracted soybean flakes at room temperature in the same manner as for Example No. 1. Heat treatment comprises of steam stripping under vacuum, i.e., 90° C. flake temperature and 10 inches of Hg vacuum, air dried to equilibrium moisture, and grounds to pass 100% through a 200-mesh screen.

Proportions for chemical treatment:

| | Parts |
|---|---|
| Soybean flakes | 100 |
| $CaCl_2 \cdot 2H_2O$ | 2 |
| $H_2O$ | 10 |

EXAMPLE NO. 3

Same as Example No. 2 but used dehulled full-fat soybean flakes. All full-fat products were ground to about 15–35 mesh.

EXAMPLE NO. 4

Full-fat soybean flakes (7% moisture) were extracted to remove the oil using a treating solution of glacial acetic acid in hexane. The defatted flakes were desolventized by steam stripping under vacuum, i.e. 90–100° C. flake temperature and 10 in. of Hg vacuum, air dried to equilibrium moisture and ground to pass 100% through a 200-mesh screen.

Proportions for chemical treatment:

| | Parts |
|---|---|
| Full-fat soybean flakes | 100 |
| Glacial acetic acid | 3 |
| Hexane | 1000 |

EXAMPLE NO. 5

Same as Example No. 1 except used the following chemicals for treatment:

| | Parts |
|---|---|
| Soybean flakes | 100 |
| Sodium acetate | 3 |
| Glacial acetic acid | 1 |
| $H_2O$ | 9 |

EXAMPLE NO. 6

Same as Example No. 1 except used the following chemicals for treatment:

| | Parts |
|---|---|
| Soybean flakes | 100 |
| $H_3PO_4$ | 0.5 |
| HCl | 2.0 |
| $H_2O$ | 7.5 |

EXAMPLE NO. 7

Same as Example No. 1 except used the following chemicals for treatment:

| | Parts |
|---|---|
| Soybean flakes | 100 |
| $H_3PO_4$ (85%) | 0.5 |
| Citric acid | 2.0 |
| $H_2O$ | 9.5 |

EXAMPLE NO. 8

(1) Same as Example No. 5 except full-fat soybean flakes were treated.

(2) Same as Example No. 6 except full-fat soybean flakes were treated.

(3) Same as Example No. 7 except full-fat soybean flakes were treated.

Additional examples of various protonic acids and their salts utilized in treating soybean particulates are listed in the following table.

SUMMARY OF DATA FOR TREATED AND UNTREATED, STEAM STRIPPED SOYBEAN FLAKE SAMPLES

| Sample No. | Treatment of flakes | pH Distillate | pH P.D.I.[1] Extract | P.D.I.[1] (Percent) | Acid or Salts for Treatment[2] |
|---|---|---|---|---|---|
| Example: | | | | | |
| 9 | Citric Acid | 4.0 | 5.1 | 9 | 3.0 |
| 10 | NaCl | 4.45 | 6.45 | 61 | 3.0 |
| 11 | Sodium acetate | 3.45 | 6.85 | 62 | 3.0 |
| 12 | $AlCl_3$ | 4.20 | 6.2 | 58 | 0.67 |
| 13 | $CaCl_2$ | 4.50 | 5.7 | 12 | 1.75 |
| 14 | $FeCl_3$ | 3.75 | 5.65 | 14 | 1.5 |
| 15 | Cobalt acetate | 3.05 | 6.65 | 44 | 3.0 |
| 16 | $BaCl_2 \cdot 2H_2O$ | 4.20 | 6.55 | 20 | 3.0 |
| 17 | Control (untreated sample) | 5.35 | 6.55 | 78 | 0 |
| 18 | $H_3PO_4$ | 3.75 | 5.45 | 12 | 3.0 |
| 19 | HCl | 3.60 | 5.15 | 10 | 2.75 |
| 20 | $CaCl_2$ | 3.85 | 5.6 | 8 | 3.0 |
| 21 | Glacial acetic acid | 2.75 | 5.95 | 28 | 1.75 |
| 22 | $CaCl_2$ | | | | [3] 3.0 |
| 23 | Glacial acetic acid | | | | [3] 1.75 |

[1] P.D.I. is equal to protein dispersible index, see Jour. AOCS; 37 165 (1960).
[2] Parts based on weight of soybean flakes.
[3] Full-fat.

Examples 9–21 were treated in the manner described in Example 2.

Example 22 was treated in the manner described in Example 3.

Example 23 was treated in the manner described in Example 4.

The following are comparative examples of resultant bread scores showing improvement in the soybean bread products using different levels of soy flour treated with different concentrations of protonic acid.

TABLE NO. I

| | Sample No. Conventional Baker's Soyflour | Conventional Baker's Soyflour | 878–20 | 878–9 |
|---|---|---|---|---|
| Glacial Acetic Acid (parts) | 0 | 0 | 3.0 | 2.0. |
| Percent Soy (based on wheat flour) | 2 | 4 | 2 | 5.5. |
| Percent Milk (based on wheat flour) | 2 | 0 | 2 | 3.5. |
| Special Treatment: | | | | |
| Post Heat Time (mins.) | | | Air dried | Air dried. |
| Vacuum (inches of Hg) | No | No | No | No. |
| Distillate (mls.) | | | | |
| Bread Score:[1] | | | | |
| Loaf Vol. (Percent of Std.) | 98 | 99 | 101 | 99. |
| Grain | Sl. open, sl. thick, round | Open, sl. thick, round | Close, thin, elongated | Close, thin, elongated. |
| Texture | Sl. harsh | Sl. harsh | Velvety | Velvety. |
| Body | Strong | Med. strong | Strong | Strong. |
| Color | 97 c | 96 | 100+ | 99 sc. |
| Odor | Sl. soy | Soy | Soy | Sl. soy. |

| | Sample No. 878–47[2] | 878–47[2] | 878–47[2] | 878–23 | 878–25 |
|---|---|---|---|---|---|
| Glacial Acetic Acid (parts) | 1.75 | 1.75 | 1.75 | 3.0 | 3.0. |
| Percent Soy (based on wheat flour) | 2.0 | 2.0 | 4.0 | 2 | 2. |
| Percent Milk (based on wheat flour) | 2.0 | 2.0 | 0 | 2 | 2. |
| Special Treatment: | | | | | |
| Post Heat Time (mins.) | | | | 24 | 4. |
| Vacuum (inches of Hg) | No | No | No | 10–12 | 10. |
| Distillate (mls.) | | | | 100 | 25. |
| Bread Score:[1] | | | | | |
| Loaf Vol. (Percent of Std.) | 101 | 102 | 101 | 101 | 101. |
| Grain | Close, thin, elongated. | Close, thin, elongated. | Sl. open, thin, round | Close, thin, elongated. | Close, thin, elongated. |
| Texture | Velvety | Velvety | Velvety | Velvety | Velvety. |
| Body | Strong | Strong | Strong | Strong | Strong. |
| Color | 100 | 100 | 100 | 100 | 100. |
| Odor | Sl. acidic | Very sl. acid | Sl. acid | Normal | Normal. |

[1] Sponge dough method.
[2] Dried using Schenecken Tubes.

Bread prepared from ground samples obtained from Examples Nos. 1, 2, 9, 10, 13, 16, 19, 20, 21 and 22 all scored normal odor when tested in bread. The above are representative of different acids and/or salts tested. However, in Example No. 17 (Control—No Treatment) the bread was scored as having soybean odor which indicates that the soybean odor can be more readily steam stripped under vacuum when the soybean flakes have been previously treated according to the process herein described. Consistent results in removal of soybean odor and flavor by steam stripping were obtained when the flake temperature, after treatment, was increased to about 90° C. under vacuum, and the volume and pressure of the steam, time and vacuum were maintained so as not to materially alter the color and the water dispersibility of the protein due to heat. It is known to the art that soybean flakes may be steam stripped under vacuum without removal of the soybean odor and flavor and with essentially no change in the protein from its native state.

The above samples were evaluated by the following formulation:

SPONGE DOUGH FORMULA

| Sponge (Lbs.) | Ingredient | Dough (Lbs.) | |
|---|---|---|---|
| 650 | Flour | 350 | 350 |
| 5 | RKD | ------- | ------- |
| 420 | Water (variable) | 240 | 240 |
| 25 | Yeast | ------- | ------- |
| ------- | Salt | 20 | 20 |
| ------- | Sugar | 50 | 50 |
| ------- | Shortening | 30 | 30 |
| ------- | Non-fat dry milk | 50 | 0 |
| ------- | Soy flour (ground to 100% through 200-mesh). | 0 | 50 |

4 hour sponge.
9 minute mix (approx.).
Scale 17.6 ounces.
5% milk solids was used as the control.
Prepared according to standard procedure.

In Table I the predominant factors of improvement were obtained when the essentially raw soybean particulates were treated in the manner illustrated in Example 4. When utilizing a volatile protonic acid in an organic solvent, it is necessary to desolventize by steam stripping under vacuum in order to obtain normal odor in the final product.

Additional illustrative examples of economical savings and improved soybean products are provided by the following:

Blend five minutes in the Peterson-Kelly Blendor.

(1) Blend the following five minutes using the Kitchen Aid Mixer (No. 1 speed).

| | | G. |
|---|---|---|
| Soy muffins: | | |
| | Premix | 140 |
| | Defatted soyflour | 6.4 |
| | Full-fat soyflour | 9.0 |
| Egg control: | | |
| | Premix | 140 |

(2) Blend the following with a single beater hand mixer.

| | | | |
|---|---|---|---|
| Soy muffins: | | | |
| | Whole milk | mls | 150 |
| | Vegetable oil | mls | 28 |
| Egg control: | | | |
| | Whole milk | mls | 120 |
| | Vegetable oil | mls | 28 |
| | Sl. beaten whole egg | g | 25 |

(3) Add the liquid ingredients to the dry ingredients in one lot blending only until the dry ingredients are all moistened. This requires mixing to the count of 8 using the Kitchen Aid Mixer set on No. 1 speed using the beater appliance.

(4) Portion 55 g. into 5 cups of a 6-cup muffin pan (166 M Mirro) which has been coated with Pam Dry Fry.

(5) Bake 25 minutes in 425° F. preheated oven.

(6) Remove immediately from the pan to a cooling rack.

In some instances it has been desirable to start with a soybean base material which was pretreated for example, as follows:

EXAMPLE NO. 24

Same as Example 1 except the hexane extracted soybean flakes were pretreated by spraying an aqueous solution onto the flakes at 80–100° C. while blending i.e. in an insulated, baffled, rotating drum or mechanical blendor, so as to obtain uniform distribution of the solution on the flakes. The treated flakes were held at temperature for 5 mins. and air dried, as the first step, followed by a second step treatment as in Example 1, with the following:

Proportions for chemical pretreatment:

| | Parts |
|---|---|
| Soybean flakes | 100 |
| (50%) $H_2O_2$ | 2 |
| $H_2O$ | 7.5 |

It has been found that in this manner of stepwise treatment, the peroxide pretreatment affords a more ideal

TABLE NO. II.—MUFFIN SCORES FOR EVALUATION OF FULL-FAT SOY FLOURS

| Muffin Sample No. | 1 | 2 | 3 | 4 | 5 |
|---|---|---|---|---|---|
| Soy Flour: | | | | | |
| Sample Identification | Egg control | Commercial sample | 1009-124-38 | 1009-124-35 | 1009-124-34. |
| Chemical Treatment | | None | 1% Citric Acid | 0.5% Phos. Acid | 0.5% $CaCl_2$. |
| Muffin Score: | | | | | |
| Internal Color | Bright yellow | Dull, dark yellow | Bright yellow | Bright yellow | Bright yellow. |
| Texture | Typical | Tough | Sl. open, tender | Good, tender | Good but Sl. tough. |
| Odor | do | Sl. off | Typical | Typical | Typical. |
| Flavor | do | Typical | do | do | Do. |

Soy flours were ground to about 15 mesh.

The above products were prepared by the following formulation.

*Preparation of the muffins*

| | | | |
|---|---|---|---|
| Premix: | | | |
| | All-purpose flour | k | 4.2 |
| | Salt | g | 40.0 |
| | Sugar | g | 420.0 |
| | Baking powder | g | 245.0 |

condition for the more specific treatments as herein provided. That is, if desired, a peroxide treatment as described in my herewith filed co-pending application Ser. No. 301,-559 may precede the treatment herein provided. In the latter application, the peroxides used are water-soluble peroxides, such as hydrogen peroxide, sodium peroxide, and urea peroxide, the amount of peroxide used being from about 0.25 part to about 5 parts per 100 parts of the legume seed particulate material treated, with not over about 20% added moisture in excess of the equilibrium moisture of the dry legume seed particulate material, with the temperature during such treatment being held at from 65° C. to 100° C. for a period of uniform treatment such as from 30 seconds to about 15 minutes.

The accompanying drawings are graphic illustrations of the relationship of varying concentrations of a protonic acid and mono- or di-valent salts of such acids on the water dispersibility of the protein.

Figure 2:
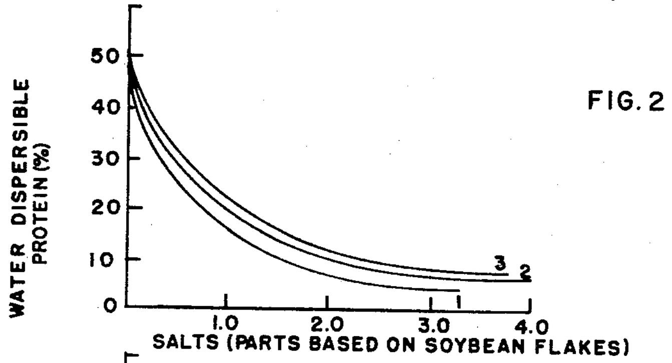
Figure 3:
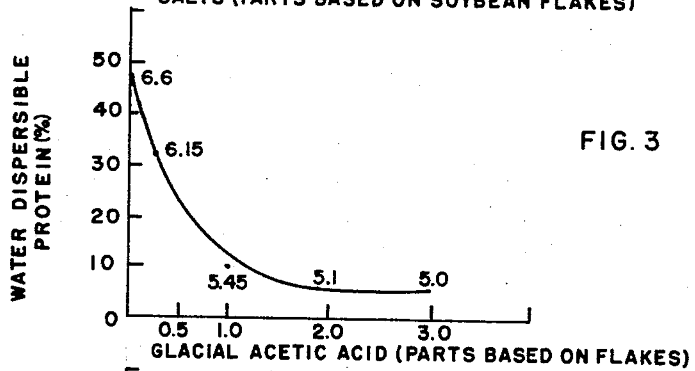

FIGURE 1 compares the water dispersibility of the protein for soybean particulates treated with a mono-valent or di-valent salt;

FIGURE 2 compares the water dispersibility of the protein for soybean particulates treated with three different divalent salts, and FIGURE 3 illustrates the water dispersibility of the protein for soybean particulates treated with a protonic acid.

Figure 4:
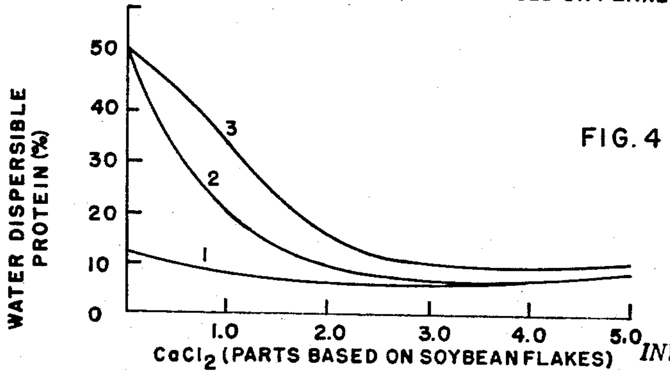

FIGURE 4 compares the water dispersibility of the protein for heat treated (toasted) and essentially native soybean particulates treated with a di-valent salt at "as is" and at adjusted pH to 6.6 (the "as is" pH for untreated soybean products).

With reference to the drawings, the curves in FIGURE 1 show the relationship of concentration of mono-valent versus a di-valent salt of a protonic acid as they affect water dispersibility of the soybean protein. The mono-valent salts have less effect on the dispersibility of the protein compared to the di-valent salt at common concentrations. Curve 1 is the di-valent salt treated soybean particulates according to Example No. 1. Curve 2 is a mono-valent salt potassium chloride and curve 3 is a mono-valent salt sodium chloride, each prepared as exemplified in Example 10.

FIGURE 2 shows the effect of concentration of divalent salts on the water dispersibility of soybean protein when treated in accordance with the process herein described. Curve 1 illustrates the results of using zinc chloride in accordance with the process of Example 16. Curve 2 illustrates the results of using calcium chloride in accordance with Example 1. Curve 3 illustrates the results of using barium chloride in accordance with the process of Example 16.

In the above figures it is believed that the change in the water dispersibility of the protein is related to the ionic reaction of the $Na^+$ and $Ca^{++}$ with the $COO^-$ of the protein molecule.

FIGURE 3 shows the effect on water dispersibility of the protein and pH, at varying concentrations of a protonic acid treatment. In this case the specific results of the glacial acetic acid treatment of Example 4 is provided. Similar curves were obtained when the treatment was with phosphoric acid as in Example 18, citric acid as in Example 9 and other protonic acids. The effect on the dispersibility of the protein in water, when treated with a protonic acid appears directly related to a change in pH towards the iso-electric point of soybean protein which is about 4.5.

FIGURE 4 illustrates the fact that the water dispersibility of the protein of $CaCl_2$-treated soybean protein is not significantly affected by neutralization of pH to 6.6. This graph also illustrates the effect of wet heat treatment such as is used for cooking or toasting soybean materials versus an essentially native soybean product on dispersibility of the protein in water. Curve 1 is typical of a cooked or toasted product in which the protein dispersibility is decreased to a minimum prior to or during the calcium chloride treatment described in the prior art. Curve 2 is a typical curve for a di-valent salt illustrating the effect of concentration of calcium chloride on the water dispersibility of the treated protein of an essentially native soybean material as described in Example No. 1.

Curve 3 illustrates that lower amounts of calcium chloride have less inhibiting affect on the dispersibility of the protein in water at a neutralized pH of 6.6 than higher amounts of calcium chloride.

From the above it will be recognized that in conjunction with the process described for removal of soybean taste and soybean odor, with color improvement and significantly improved wetting properties, the treatment of soybean particulate materials with protonic acids, the salts of protonic acids or mixtures of the same require specific and critical conditions with retention of the good functional characteristics of an essentially native soybean product, which may or may not have been initially treated with a water soluble peroxide, as for example, described in my herewith filed co-pending application, Serial No. 301,559.

Each and all of the water soluble ionizable protonic acids as defined by the Brönsted-Lowry Theory and their water soluble ionizable salts are more or less operable. The ionizable acids and salts are preferably of a class suitable for human consumption. However, for industrial use such protonic acids and the salts of such acids may be used in the process described. Such acids and/or salts of such acids have been exemplified in the above examples. It is, of course, understood that the economy and practical application will determine the choice of reagent. Such protonic acids and the salts thereof are well known to the art. They can be utilized in the range of about 0.5 part to about 5 parts and preferably in the range of about 1 part to about 3 parts based on 100 parts soybean particulates, with the acids and salts used singly or in any combination desired. Additionally, the heat treatment may be effected by micro-wave heating radiation or irradiation to provide flash-off of the liquid carrier without necessarily changing the beneficial properties herein provided.

From the above description, it will be apparent that some modifications and variations of the invention and improvement as hereintofore set forth may be made without departing from the spirit and scope thereof. The specific embodiments described are given by way of examples illustrative of the invention and improvement which is to be limited only by the terms of the appended claims.

The embodiments of the invention in which an exclusive property or privilege is claimed are defined as follows:

1. The process of removing characteristic soybean odor and soybean taste from particulates of dehulled soybean material comprising the steps of treating about 100 parts of dehulled particulates of soybean material with a treating agent consisting essentially of chemical material selected from the group consisting of water-soluble, ionizable protonic acids, the salts of said protonic acids, and mixtures of the same in an aqueous solution (intimately contacting the said chemical material with the said particulates), said treatment incorporating about 0.5 to 5 parts, based on 100 parts of said soybean particulates, of the chemical material in said soybean particulates and said treatment incorporating moisture in the particulates to a level of at least about 7% to not over 20% of equilibrium moisture, holding the said treated particulates at a temperature of 65° C. to not over 100° C. for a period of a few seconds to not over about 15 minutes and drying the said soybean particulates, producing a soybean product free of soybean odor and soybean taste without detrimental effect to product, color, physical and functional characteristics.

2. The process of claim 1 including, immediately after the holding period, steam stripping said treated soybean particulates under vacuum, and drying the steam stripped product.

3. A method comprising treating hexane-extracted soybean flake material with a treating agent consisting essentially of a chemical material selected from the group consisting of water-soluble, ionizable protonic acids, the salts of said acids and mixtures of said acids and salts in an aqueous solution, intimately contacting the said chemical material with the said particulates, said treatment incorporating about 0.5 part to 5 parts of chemical material in said soybean flake material based on 100 parts of said extracted soybean flake material, and said treatment incorporating moisture to a level of at least about 7% to not over 20% of equilibrium moisture of said soybean flake material, holding the so-treated soybean flake material at a temperature of from 65° C. to not over 100° C. for a period of a few seconds to not over 15 minutes, and drying the so-treated soybean flake material.

References Cited

UNITED STATES PATENTS

| | | | |
|---|---|---|---|
| 1,510,606 | 10/1924 | Phillips | 99—98 |
| 1,912,895 | 6/1933 | Gossel | 99—98 |
| 2,322,516 | 6/1943 | Horvath | 99—98 |
| 2,930,700 | 3/1960 | Bradof | 99—98 |
| 3,100,709 | 8/1963 | Paulsen | 99—98 |
| 3,126,286 | 3/1964 | Moshy | 99—98 |

ALVIN E. TANENHOLTZ, *Primary Examiner.*

A. LOUIS MONACELL, *Examiner.*

S. J. BAICKER, *Assistant Examiner.*